June 10, 1958
J. B. COX
2,837,826
ANGLE SETTING AND MEASURING INSTRUMENT
Filed June 7, 1955
6 Sheets-Sheet 1
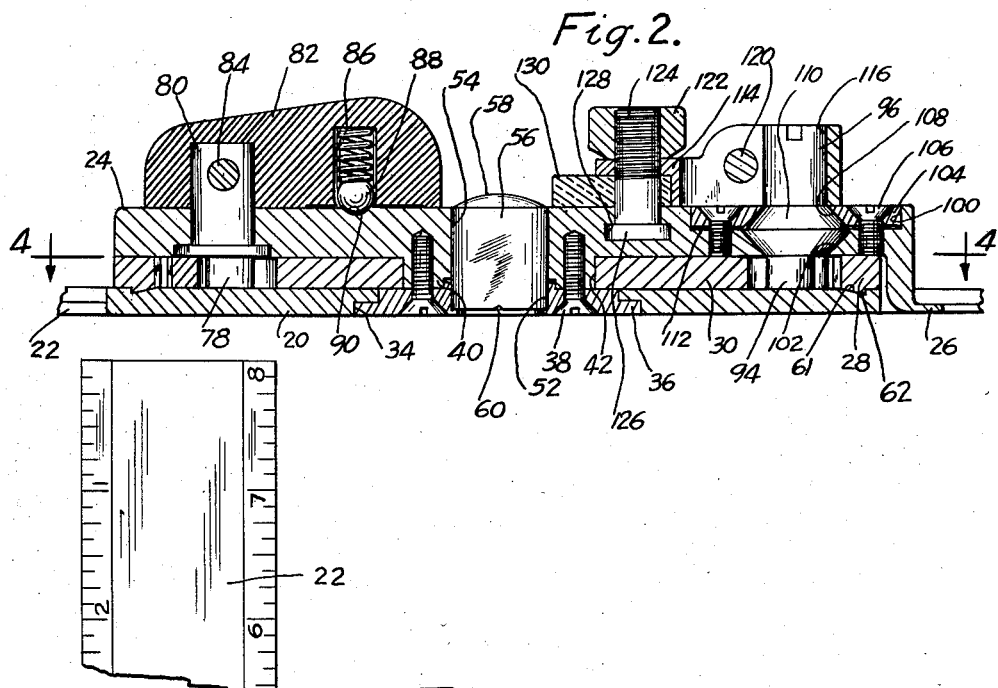
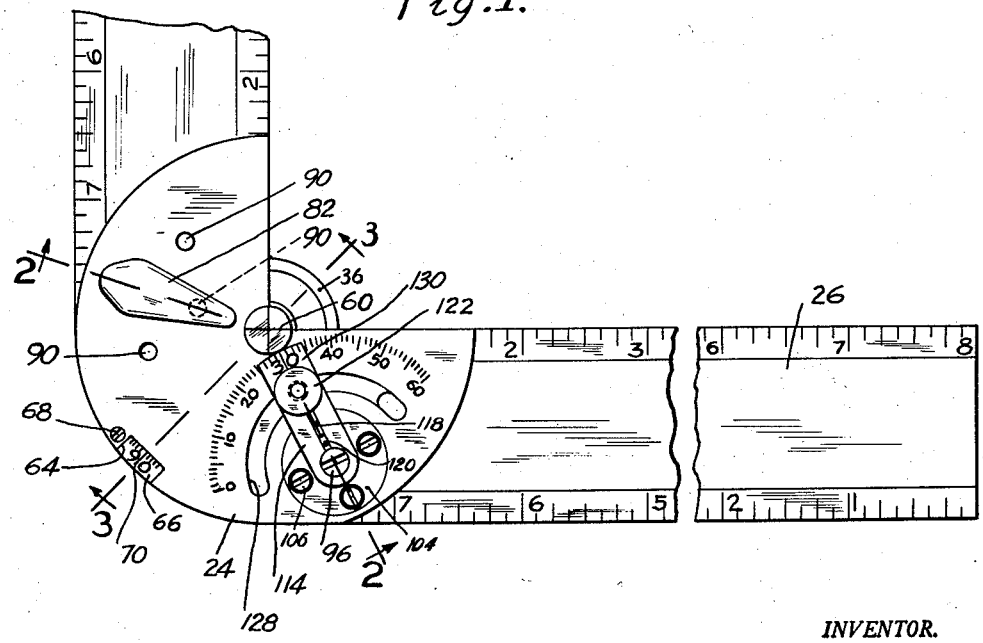
INVENTOR.
JOSEPH B. COX
BY
Buckhorn and Cheatham
ATTORNEYS

INVENTOR.
JOSEPH B. COX

June 10, 1958  J. B. COX  2,837,826
ANGLE SETTING AND MEASURING INSTRUMENT
Filed June 7, 1955  6 Sheets-Sheet 4
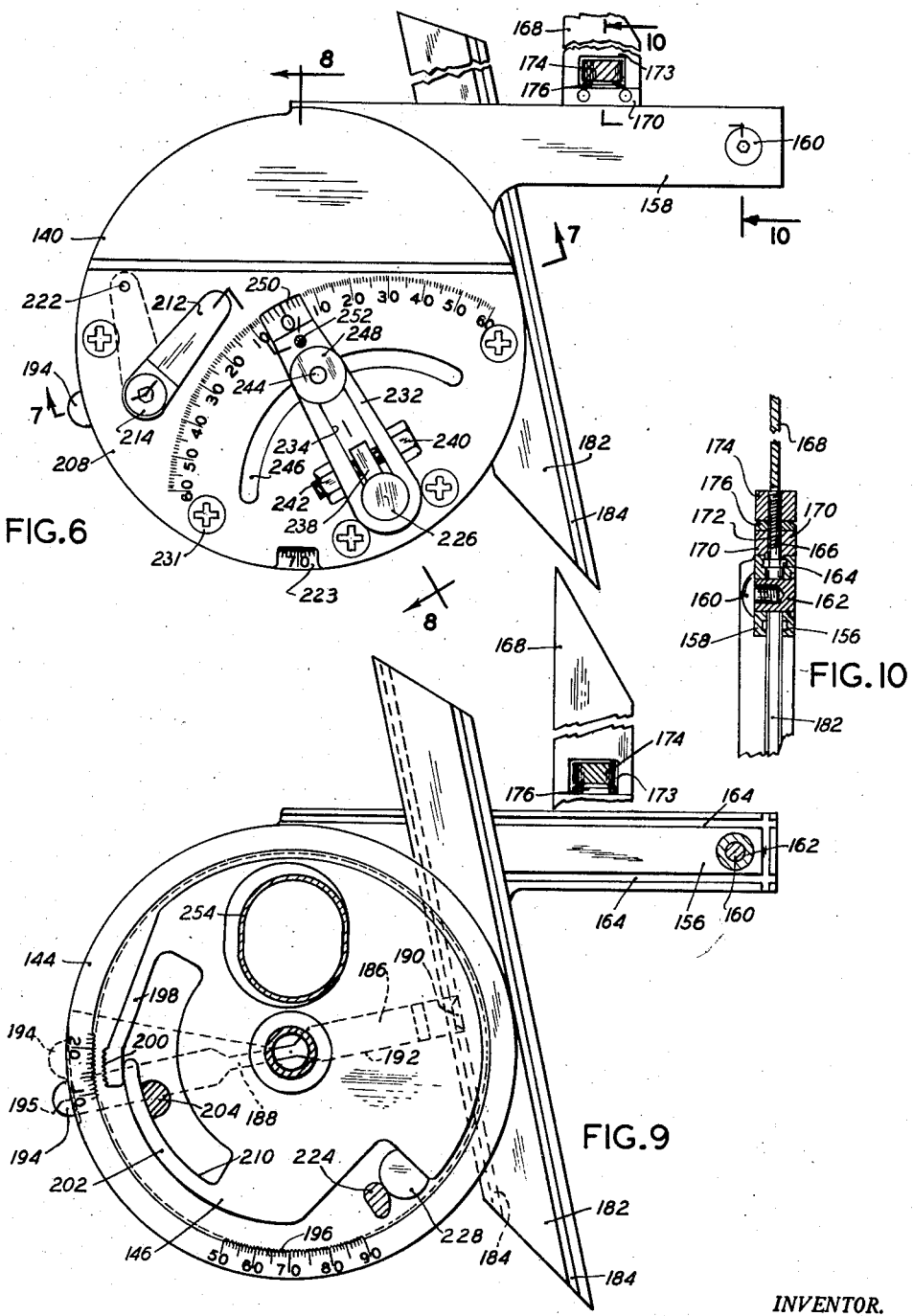
INVENTOR.
JOSEPH B. COX
BY
Buckhorn and Cheatham
ATTORNEYS June 10, 1958  J. B. COX  2,837,826
ANGLE SETTING AND MEASURING INSTRUMENT
Filed June 7, 1955  6 Sheets-Sheet 5

INVENTOR.
JOSEPH B. COX
BY
Buckhorn and Cheatham
ATTORNEYS

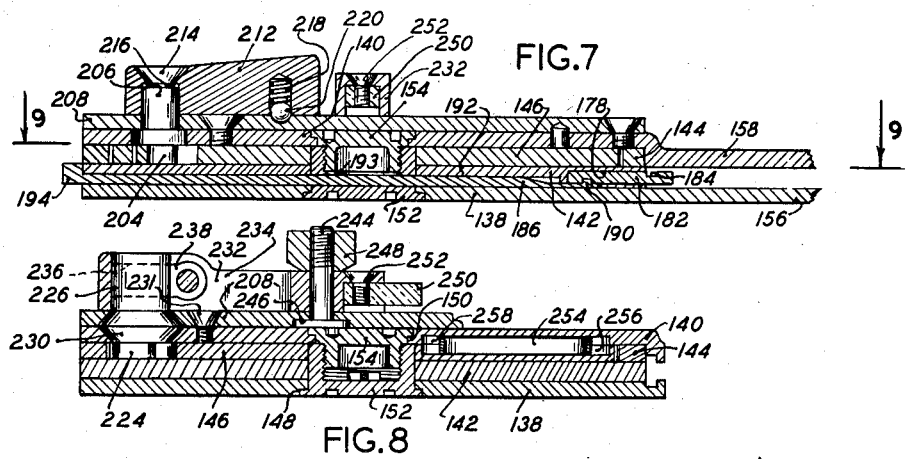
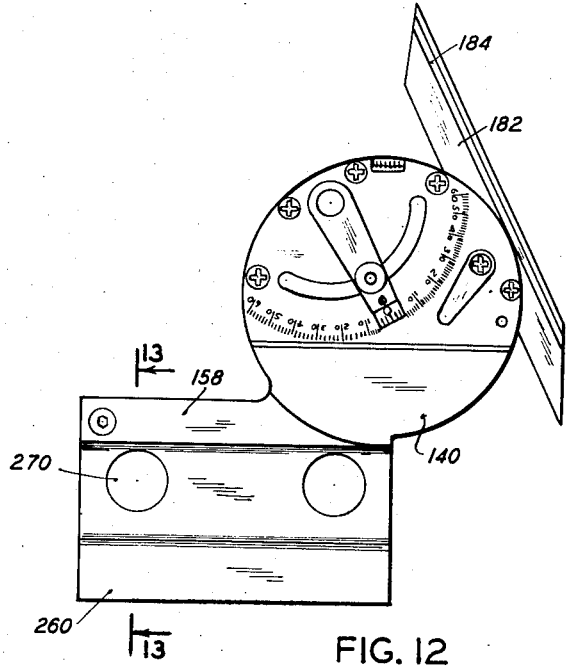
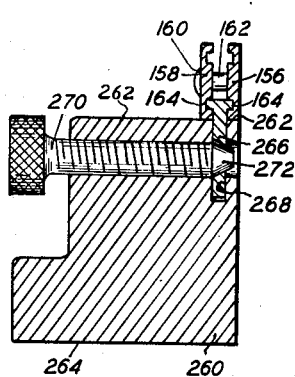

United States Patent Office 2,837,826
Patented June 10, 1958

2,837,826

ANGLE SETTING AND MEASURING INSTRUMENT

Joseph B. Cox, Portland, Oreg.

Application June 7, 1955, Serial No. 513,679

14 Claims. (Cl. 33—75)

This invention relates to an angle setting and measuring instrument, and more particularly to a device which can be employed to position relative to each other two members having straight edges or flat surfaces so that such edges or surfaces are at a desired angle to each other which is accurate within small limits.

The instrument of the present invention can be employed either to construct angles or to measure angles. That is to say, it can be rapidly set to the desired angle and then used for the purpose of drawing or scribing such angle on a surface, or it can be employed to align or position edges or surfaces of elements such as machine tools or work pieces at a desired angle to each other or to a reference plane. It can also be employed to measure existing angles, either angles drawn or scribed on a surface or the angles between edges or surfaces of mechanical elements, for example, the various angles between the cutting edges on machine tools or the angles between edges or surfaces on work pieces being produced. The instrument includes an increment locking mechanism by which two members can be locked together at predetermined equal angular increments, the preferred arrangement being the employment of an increment ring having accurately formed teeth thereon with a circular pitch of one degree in combination with an index member carrying a locking element having similar teeth engageable with the first-mentioned teeth. The instrument also includes a separate mechanism for positively moving a third member relative to the index member through smaller angles within the predetermined angular increments referred to. The smaller angles are set and indicated by a motion-amplifying mechanism, preferably employing a rotary cam and cam anvil so that the smaller angles are indicated upon an enlarged scale on the instrument, thereby eliminating the necessity of verniers.

It is therefore an object of the present invention to provide an improved angle setting and measuring instrument in which members having straight edges or flat surfaces may be set at angular positions relative to each other accurately within small limits without the employment of verniers.

Another object of the invention is to provide an angle setting and measuring instrument in which two members be set relative to each other at predetermined equal angular increments and then one of the elements moved relative to the other within such increments by a motion-amplifying mechanism such that the angle between the straight edges can be more rapidly and accurately read.

A further object of the invention is to provide an angle setting and measuring instrument in which an element can be locked to a second element at predetermined equal angular increments and then another element angularly moved relative to the second element through small angles within such increments by a mechanism indicating the angle between the second element and the other element on an enlarged scale.

A still further object of the invention is to provide an angle setting and measuring instrument in which two elements may be set with respect to each other at angles measured in even degrees and another element may be angularly moved with respect to one of the first-mentioned elements by a positive drive mechanism between the latter two elements involving motion amplification and indicating structure enabling angles less than one degree to be indicated upon an enlarged scale.

Other objects and advantages of the invention will appear in the following description given in connection with the attached drawings of which:

Fig. 1 is a plan view of a device in accordance with the present invention;

Fig. 2 is a partial vertical section, on an enlarged scale, taken on the line 2—2 of Fig. 1;

Fig. 6 is a plan view of a modified device in accordance with the present invention;

Fig. 7 is a vertical section, on an enlarged scale, taken approximately on the line 7—7 of Fig. 6;

Fig. 8 is a view similar to Fig. 7 taken on the line 8—8 of Fig. 6;

Fig. 9 is a horizontal section taken on the line 9—9 of Fig. 7;

Fig. 10 is a vertical section taken on the line 10—10 of Fig. 6;

Fig. 12 is a plan view of the device of Figs. 6 to 11, with a base member substituted for one of the scales; and Fig. 13 is a vertical section taken on the line 13—13 of Fig. 12.

Figure 4:
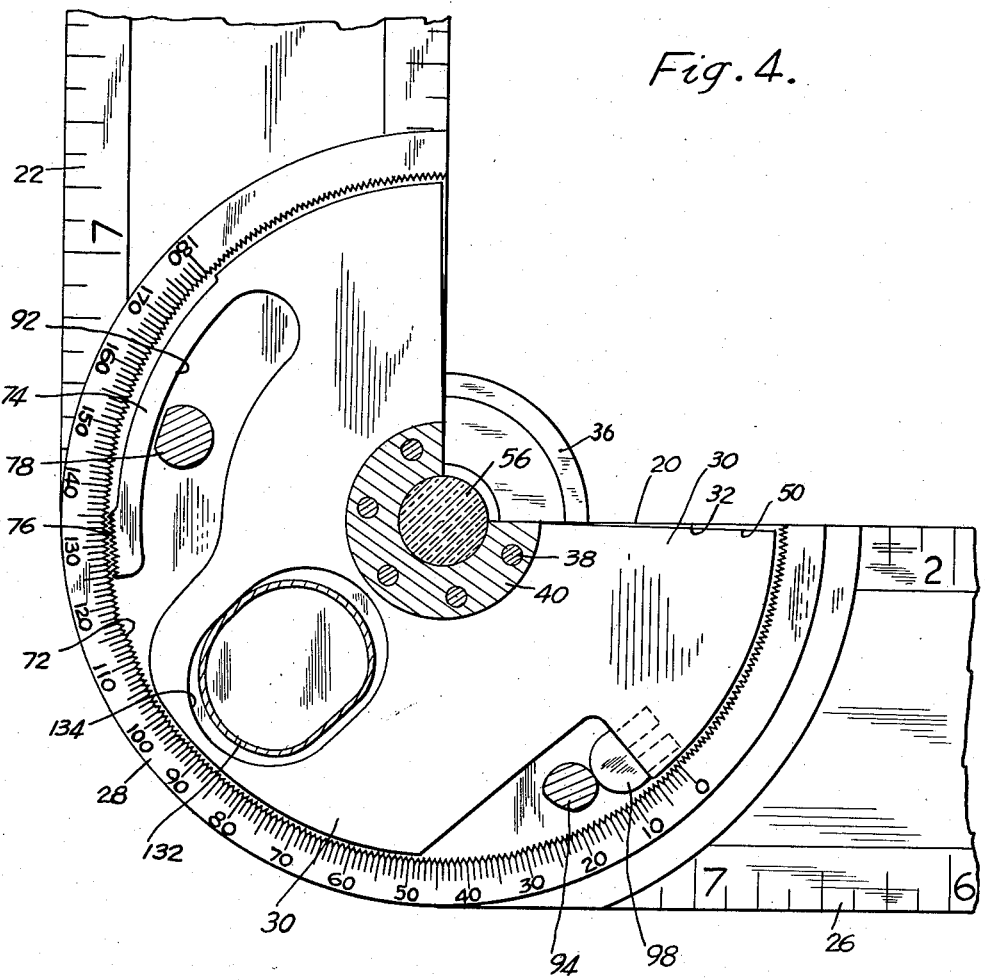
Fig. 4 is a horizontal section taken on the line 4—4 of Fig. 2.
Figure 3:
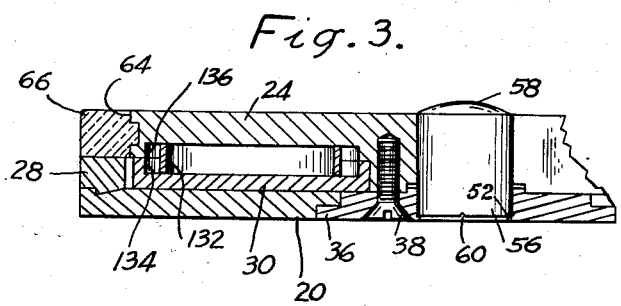
Fig. 3 is a view similar to Fig. 2 taken on the line 3—3 of Fig. 1.

Referring more particularly to the drawings, the device shown in Figs. 1 to 5 inclusive includes a bottom plate 20 having an integral, tangentially extending blade or scale 22 and a top plate 24 also having an integral, tangentially extending blade or scale 26 positioned in the same plane as the ruler 22. The device also has an increment ring 28 mounted on the upper surface of the bottom plate 20 adjacent its periphery and an index plate 30 positioned between the bottom plate 20 and the top plate 24 interiorly of the increment ring 28. The bottom plate is arcuate and extends through an angle of 270 degrees, i. e., one quadrant is removed at 32 (Figs. 4 and 5) and is provided with a shouldered opening 34 concentric with its periphery. The bottom plate 20 is journaled upon a bearing plate 36 fitting within the shouldered opening 34 and secured to the top plate 24 by the screws 38 (Fig. 2), the bearing plate extending through 360 degrees. The top plate 24 has a downwardly extending, centrally disposed boss 40 against which the bearing plate 36 is held by the screws 38 and which provides a space between the top plate 24 and base plate 20 in which the index plate 30 is positioned. The index plate 30 has an opening 42 surrounding the boss 40 providing for pivotal movement of the index plate 30 about the axis of the boss 40. The bottom plate is held in position upon the bearing plate 36 by the index plate 30 and can be pivotally moved relative to the index plate and top plate 24 about an axis concentric with the boss 40.

Figure 5:
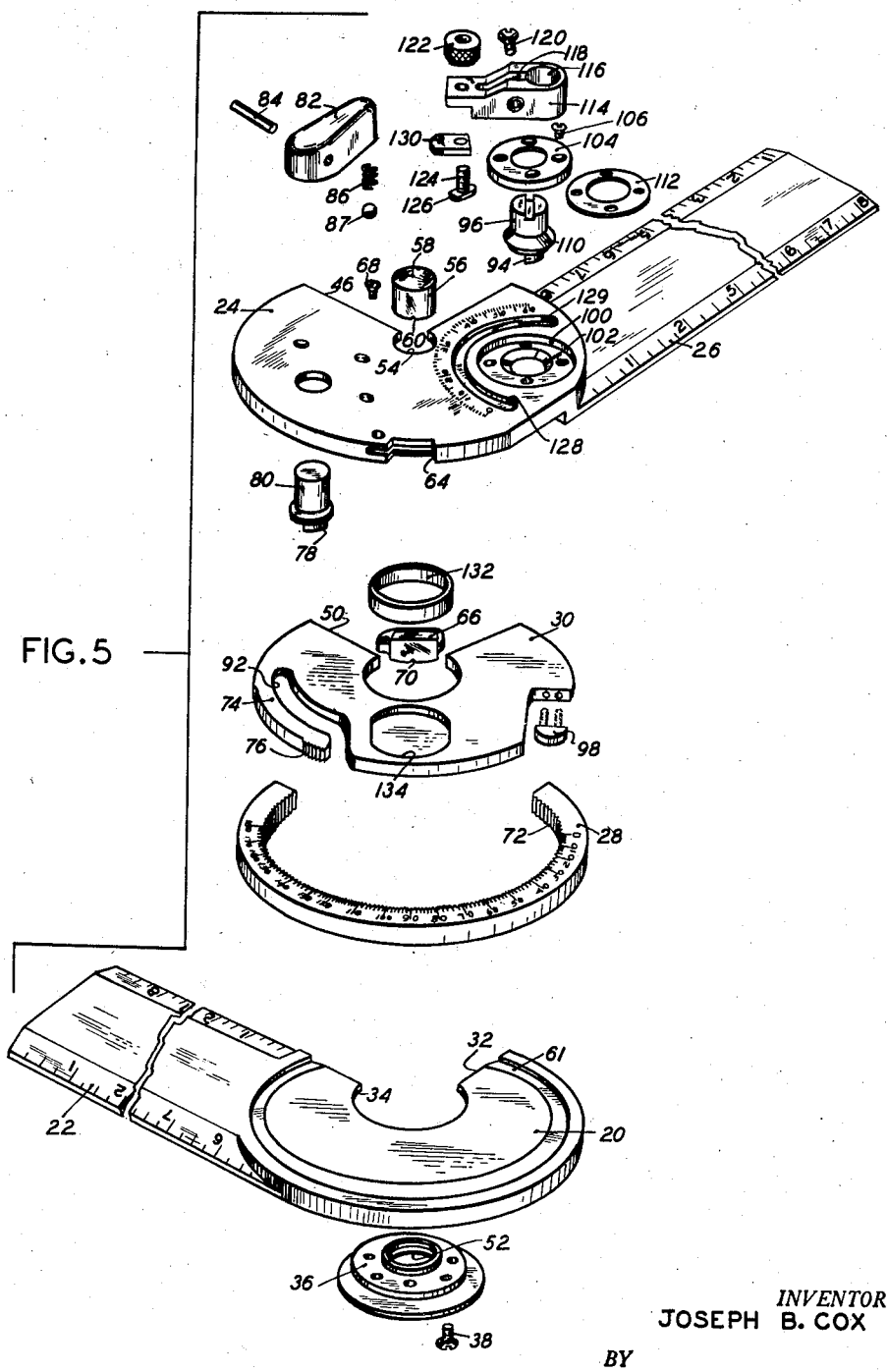
Fig. 5 is an exploded, isometric view of the parts of the device shown in Figs. 1 to 4 inclusive.

The top plate 24 is also arcuate and extends through an angle of 270 degrees, i. e., it has a quadrant removed at 46 (Fig. 5). The index plate 30 is also arcuate and extends through an angle of 268 degrees, i. e., it has two degrees more than a quadrant removed therefrom at 50 (Figs. 4 and 5). The bearing plate 36 is provided with a central, circular opening 52 (Figs. 2 and 5) in alignment with a central, arcuate opening 54 in the top plate 24. A center sight glass 56 of transparent plastic, glass or other suitable transparent material is positioned in the openings 52 and 54, the sight glass 56 being cylindrical and having a lens surface 58 on its top and suitable cross marks 60 (Fig. 1) on its lower surface intersecting at the center of the sight glass. The inner edges of the rulers 22 and 26 are also in alignment with the intersection of the cross marks 60. From the above description, it will be apparent that the bottom plate 20 carrying the ruler 22 can be pivoted on the bearing plate 36 through an angle somewhat greater than 180 degrees with respect to the upper plate 24 carrying the ruler 26. That is to say, the ruler 22 can be pivoted relative to the ruler 26 ninety degrees clockwise from the position shown in Fig. 1 until its inner edge is in contact with the inner edge of the ruler 26 or it can be pivoted somewhat further than ninety degrees in the opposite direction.

The base plate 20 has the increment ring 28 secured to its upper surface adjacent its periphery, for example, by silver soldering or brazing, the base plate 20 being provided with a triangular groove 61 extending circumferentially around its upper surface and the degree ring 28 having a corresponding ridge 62 fitting in the groove 61. The increment ring 28 may be provided upon its upper surface with graduations in degrees and the top plate 24 is notched at 64 to receive a sight glass 66 made of any suitable transparent material such as plastic held therein by a screw 68, the sight glass having an index line 70 on its lower surface adjacent the graduated upper surface of the increment ring 28. The increment ring may be graduated to show the angle in degrees between the rulers 22 and 26 measured from a position in which the inner edges of the rulers are in contact with each other.

The inner periphery of the increment ring 28 is provided with a plurality of accurately formed, triangular teeth 72 extending radially inwardly and having a circular pitch of one degree. The index plate 30 is provided with a spring locking element 74 (Fig. 4) having its free end also provided with accurately formed, triangular teeth 76 having a circular pitch of one degree and directed radially outwardly toward the teeth 72 on the increment ring 28. The locking element resiliently tends to remain in the position shown in Fig. 4 in which the teeth 76 thereon are out of engagement with the teeth 72 on the increment ring 28 but may be moved into locking engagement therewith by rotation of a locking cam 78 carried by a cam member 80 journaled in the top plate 24 (Fig. 2) and having an actuating or locking lever 82 secured to its upper end by a pin 84. The lever 82 may be maintained in its neutral position shown in Figs. 1 and 2 or in locking position approximately 60 degrees either way from the neutral position by means of ball detent mechanism including a spring 86 positioned in an upwardly extending, downwardly opening bore in the bottom of the lever and a ball 88 urged downwardly by the spring into suitably positioned detent recesses 90 in the upper surface of the top plate 24.

In the neutral position of the lever 82, the cam 78 is in the position shown in Fig. 4 so that the teeth 76 on the locking element 74 are out of engagement with the teeth 72 on the degree ring 28. It will be apparent that rotation of the cam 78 in either direction by the lever will force the teeth on the locking element 74 into engagement with the teeth on the increment ring 28 to lock the index plate 30 to the increment ring 28 and, therefore, to the bottom plate 20 at angles differing from each other by equal increments of one degree, i. e., at angles measured in even degrees. The inner edge 92 of the locking element 74 is concentric with the pivotal axis of the index plate 30 about the boss 40 on the upper plate 24 when the teeth 76 of the locking element 74 have been engaged with the teeth 72 on the increment ring 28 by the cam 78. Thus the index plate 30 may be rotated through a small angle with respect to the top plate 24 carrying the cam 78 without varying the engagement between the teeth 76 and the teeth 72.

The index plate 30 may be rotated through such small angle, for example, an angle measured in minutes, with respect to the top plate 24 by means of a minute cam 94 carried by a cam member 96 journaled in the top plate 24 and engaging cam anvil 98 (Fig. 4) carried by the index plate 30. The top plate 24 is provided with a circular recess 100 (Fig. 2) in the bottom of which is a frusto-conical bore 102 extending downwardly through the lower surface of the top plate 24 and having its narrower diameter at the lower surface of the top plate 24. A cover plate 104 is received in and fits the circular recess 100 and is held in position therein by screws 106. The cover plate 104 also has a frusto-conical bore 108 therein, which bore has its smaller diameter at the upper surface of the plate 104 and is concentric with the similar bore 102 in the top plate 24. The cam member 96 is provided with an intermediate portion 110 providing a pair of intersecting, concentric, frusto-conical surfaces having their portions of greater diameters at their intersection. The intermediate portion 110 of the cam member 96 fits the frusto-conical bores in the top plate 24 and cover plate 104. It will be apparent that tightening the screws 106 will cause the cover plate 104 to snugly engage the intermediate portion 110 of the cam member 96 and cause the lower frusto-conical surface of such intermediate portion to snugly engage the frusto-conical bore 102 in the top plate 24. A shim 112 between the cover plate 104 and the top plate 24 may be employed, if desired, the thickness of the shim 112 being variable to obtain a bearing fit without play between the intermediate portion of the cam member 96 and the frusto-conical bores in the cover plate and top plate.

The cam member 96 may be rotated to rotate the cam 94 by a minute cam lever 114 having a bore 116 fitting the top portion of the cam member 96 and also having a slot 118 extending longitudinally of the lever and intersecting the bore 116 so that the lever can be clamped to the cam member 96 by means of a clamp screw 120 extending laterally through the lever. The minute cam lever 114 can be pivoted about the axis of the cam member 96 to rotate the cam member 96 by means of a minute cam lock nut 122 which is screw-threaded upon the upper end of a minute cam lock bolt 124 having a laterally elongated head 126 positioned in a T-slot 128 which extends arcuately and concentrically with the frusto-conical bore 102 in the top plate 24, i. e., the T-slot is concentric with the axis of the cam member 96. The minute cam lock bolt 124 can be inserted into the slot 128 through the bore 129 (Fig. 5) in the top plate 24 and extends upwardly through the end of the minute cam locking lever 114 which is remote from the cam member 96. It will be apparent that the lever 114 may be locked in any desired angular position within the limits of the slot 128 by tightening the nut 122 on the bolt 124. The end of the minute cam lever 114 remote from the cam member 96 is provided with a sight glass 130 of any suitable transparent material such as plastic or glass, the sight glass 130 overlying graduations upon the upper surface of the top plate 24 and the graduations being arranged in an arc concentric with the axis of the cam member 96.

The cam anvil 98 secured to the index plate 30 is spring-pressed toward the cam 94 by means of a spring 132 (Figs. 3, 4 and 5) in the form of an annulus made of thin, spring material such as spring brass or spring steel. The spring 132 has its axis parallel to the axis of the index plate 30 and has its lower portion received in a recess 134 of oval outline in the upper surface of the index plate. The upper portion of the spring is received in a similar recess 136 (Fig. 3) in the lower surface of the top plate 24, the two recesses being out of alignment circumferentially of the plates in order to stress the spring 132 and maintain the cam anvil 98 (Fig. 4) firmly in engagement with the cam 94 at all times. It will be apparent that angular movement of the minute cam lever 114 about the axis of the minute cam member 96 will cause relative movement between the upper plate 24 and the index plate 30 by reason of the action of the cam 94 on the cam anvil 98, the cam 94 being accurately formed such that movement of the minute lever 114 through an angle corresponding to the distance between adjacent graduations on the upper surface of the top plate 24 will cause relative movement between the top plate 24 and the index plate 30 equal to one minute. As shown in Fig. 1, the graduations on the top plate may be from 0 to 60 minutes.

The operation of the device of Figs. 1 to 5 inclusive should be apparent from the above description. By first moving the locking lever 82 to its neutral position, the index plate and bottom plate are unlocked from each other and the rules 22 and 26 may be manually moved relative to each other. This rotates the top plate 24 relative to the bottom plate 20 carrying the increment ring 28. The index plate 30 is moved with the top plate 24. When a desired angle is read approximately upon the graduations of the degree ring 28 by reference to the sight glass 70, the locking lever 82 can be moved into one of its locking positions. This rotates the cam member 80 to rotate the cam 78 and cause the locking element 74 to engage its teeth 76 with the teeth 72 on the inner periphery of the increment ring 28, resulting in locking the index plate to the bottom plate 20 at any selected angle. If the desired angle is measured in even degrees, the minute cam lever 114 is set and locked at its zero position. If the desired angle is not measured in equal degrees, the minute cam lever 114 may be released from the top plate 24 by loosening the lock nut 122 on the lock bolt 124 and moving the lever 114 to a position in which the desired minute or fraction of a minute is indicated on the scale on the upper surface of the top plate 24. This moves the top plate 24 relative to the index plate 30 and therefore relative to the base plate 20 to which the index plate is locked by the teeth 76 on the degree locking element 74. It will be further apparent that the two adjustments just referred to may be made in any desired order so that the two rulers or scales 22 and 26 can be set with respect to each other at any desired angle within small limits, settings to angles measured in even minutes being possible without the use of a vernier or estimation of distances between graduations. Fractions of a minute may, however, be estimated between graduations.

The instrument shown in Figs. 6 to 11 inclusive operates in a manner analogous to that of the device shown in Figs. 1 to 5 inclusive but differs somewhat in structure. In the structure of Figs. 6 to 11 inclusive, bottom and top plates 138 and 140, respectively, are secured together so as to turn together relative to a scale-holding member 142 which is positioned between the top and bottom plates and which carries an increment ring 144 secured to the outer periphery of its upper surface, for example, by silver soldering or brazing. An index plate 146 is received within the degree ring 144 and thus positioned between the top plate 140 and the scale-holding member or plate 142. The bottom and top plates 138 and 140, respectively, are provided with centrally disposed, shouldered apertures 148 and 150, respectively, the aperture 148 in the bottom plate receiving the head of an internally threaded member or nut 152 threaded onto a screw 154 having its head received in the aperture 150 of the top plate 140. The shoulders provided by the aperture 150 in the top plate 140 are positioned between the nut 152 and the head of the screw 154 so as to clamp the top plate relative to the screw 154 and space the top plate 140 from the head of the nut 152.

The bottom plate 138 and the top plate 140 are provided with tangentially extending arms 156 and 158, respectively. The ends of the arms are secured together by means of a screw 160 and a nut 162 (Figs. 6 and 10), the head of the nut 162 being recessed into the lower surface of the arm 156 to provide a flat surface. The arms 156 and 158 are spaced from each other and are provided with opposed grooves 164 along their edges and across their ends (Figs. 10 and 11) for receiving the head of a scale-holding screw 166. The screw 166 holds a scale or blade 168 in any desired position along the edges or ends of the arms 156 and 158. As shown in Fig. 10, the end of the scale 168 is provided with a pair of guides 170 suitably secured thereto on opposite sides adjacent one end of the scale 168. The guides provide surfaces extending laterally of the scale 168 and perpendicular to the side edges of the scale adapted to bear against the edges or ends of the arms 156 and 158. The scale has a slot 172 extending longitudinally into its end between the guides 170 for receiving the shank of the holding screw 166. The scale 168 also has a cut-out portion 173 above the guides 170 for receiving a locked nut 174 screw-threaded upon the shank of the screw 166 and a thrust washer 176 positioned between the nut 174 and the guides 170. By the structure just described, it will be apparent that the scale or blade 168 may have its end secured to the arms 156 and 158 at any position along their edges, or at their ends, so that the scale 168 extends outwardly at right angles to the edges or ends of the arms to which it is secured.

The scale-holding member 142 (Fig. 7) is positioned between the bottom plate 138 and the index plate 146 and is journaled on the nut 152 holding the top and bottom plates together. The member 142 is provided with a tangentially extending slot 178 shaped to receive an angle blade or scale 182 having a groove 184 in each of its faces and extending longitudinally thereof adjacent an edge of the blade.

Figure 11:
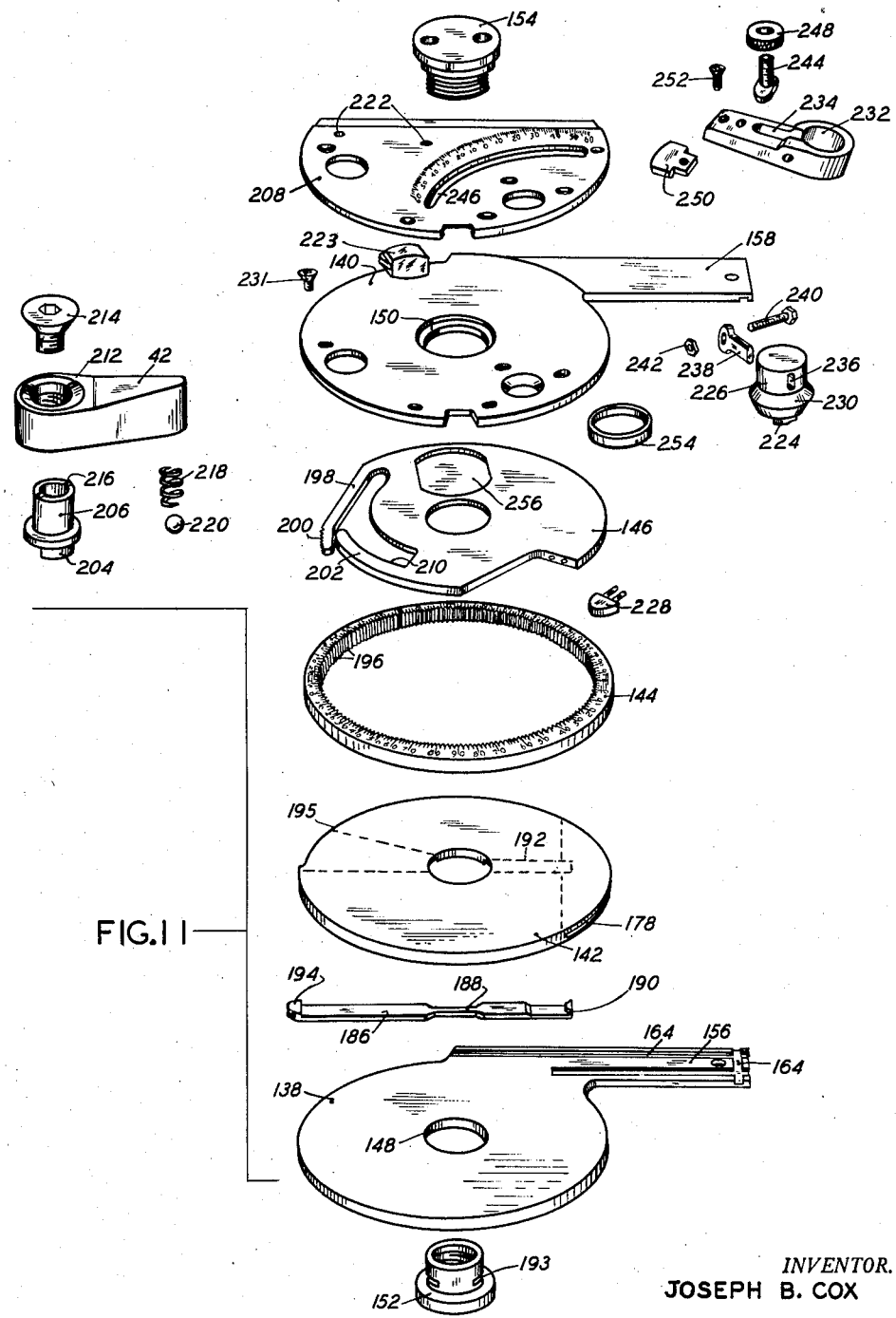
Fig. 11 is an exploded, isometric view of certain parts of the device of Figs. 6 to 10 inclusive.

The angle blade 182 is held in the slot 178 by a clamping member 186 extending diametrically through the instrument, the clamping member 186 being in the form of a flat bar having a narrow, resilient center portion 188 (Figs. 9 and 11). The end of the clamping member 186 adjacent the slot 178 is of reduced thickness and has a rib 190 (Figs. 7 and 9) engaging in and fitting one of the grooves 184 in the scale 182. The clamping member is received in a diametrically extending slot 192 in the bottom surface of the scale-holding member 142 and passes through slots 193 in the nut 152. The clamping member 186 has an end 194 projecting beyond the periphery of the scale-holding member 142 opposite the slot 178. The portion 194 is of greater thickness than the remainder of the clamping member 186 and has a surface bearing against the outer periphery of the scale-holding member 142. The slot 192 in the lower surface of the scale-holding member 142 is widened circumferentially of the scale-holding member to provide a sector-shaped porton in the scale-holding member opposite the slot 178 for the scale. This enables the end 194 of the clamping member 186 to be moved laterally, the clamping member resiliently bending at its narrow, intermediate portion 188. As shown in Fig. 11 and in dotted lines in Fig. 9, the periphery of the scale-holding member 142 is formed with a cam portion 195 so that the movement of the end 194 of the scale lock in a clockwise direction in Fig. 9 moves the rib 190 of the clamping member 186 to the left in Fig. 9 to clamp the scale 182 in the slot 178. It will be apparent that the scale 182 may be slipped lengthwise of the scale into the slot 178 so as to engage the groove 184 thereon with the rib 190 on the clamping member 186 when the clamping member has its end 194 in the scale release, i. e., the full-line position shown in Fig. 9, and that movement of such end 194 to the dotted-line position shown in Fig. 9 will clamp the scale 182 in the slot 178. The clamping member 186 is prevented from being withdrawn from the slot 192 when the scale 182 is removed from the slot 178 by reason of the locking rib 190 engaging the inner surface of the slot 178. That is to say, the slot 192 is of a depth adjacent the slot 178 which is less than the combined thickness of the clamping member 186 and the rib 190.

As stated above, the scale-holding member is rotatable with respect to both the bottom plate 138 and the top plate 140, and is also rotatable with respect to the index plate 146 positioned interiorly of the increment ring 144 carried by the scale-holding member 142. The scale-holding member 142 may, however, be locked to the index plate 146 at angular positions spaced from each other by even degrees. That is to say, the index ring 144 is provided on its inner periphery with a plurality of accurately shaped, radially inwardly extending, triangular teeth 196 (Fig. 9) having a circular pitch of one degree. The index plate 146 is provided with a locking member 198 in the form of a tangentially extending, resilient arm having at its end a plurality of accurately shaped, triangular teeth 200 directed toward the teeth 196 on the degree ring 144, the teeth 200 also having a circular pitch of one degree and being adapted to engage with the teeth 196. The index plate 146 is provided with another resilient arm 202 extending circumferentially in a direction opposite to the arm 198. The arm 202 has its end positioned behind the end of the arm 198 carrying the teeth 200. A locking cam 204 carried by a cam member 206 (Fig. 7) journaled in the upper plate 140 and in a dial plate 208 partially covering the top plate 140 is positioned to engage the radially inner surface of the arm 202. The cam 204 is positioned such that rotation of the cam about the axis of the cam member 206 forces the arm 202 outwardly to thus force the end of the arm 198 carrying the teeth 200 toward the index ring 144 to engage the teeth 200 with the teeth 196 on such ring. The radially inner surface 210 of the arm 202 is concentric with the axis of rotation of the index plate 146 about the nut 152 when the cam has been rotated to force the end of the arm 202 radially outward. The arms 198 and 202 are of resilient material and tend to return to the position shown in Fig. 9. While such arms are shown as being integral with the index plate 146, it will be understood that such arms may be of separate elements suitably secured to the index plate.

The cam member 206 has an actuating lever 212 secured to its upper end by a screw 214 threaded into the upper end of the cam member 206. The upper end of the cam 206 is provided with a diametrically extending ridge 216, and the lever 212 is provided with a bore fitting the upper end of the cam member 206 and having a shoulder engaging the top of the cam member and the ridge 216 to prevent relative rotation between the lever and the cam member 206. The lever 212 has on and off positions, as indicated in Fig. 6, and is provided with a downwardly opening bore adjacent its free end receiving a compression spring 218 and a ball 220, the spring resiliently urging the ball downwardly into engagement with detent recesses 222 formed in the upper face of the dial plate 208 at the on and off positions. The upper surface of the increment ring 144 is graduated in degrees, and the top plate 140 has a cut-out portion at its periphery for receiving a sight glass 223 of any suitable transparent material, the sight glass having an index mark on its lower surface adjacent the graduations on the degree ring.

The top plate 140 may be moved through small angles relative to the index plate 146 by a minute cam 224 (Fig. 8) carried by a cam member 226 journaled in the top plate member 140 and the dial plate 208, the cam 224 being in engagement with a cam anvil 228 (Fig. 9) carried by the index plate 146 and extending circumferentially toward the cam 224. As shown most clearly in Fig. 8, the cam member 226 has an intermediate portion 230 of enlarged diameter formed by upper and lower frusto-conical surfaces intersecting at their portions of larger diameter. The top plate 140 and the dial plate 208 have bores provided with corresponding frusto-conical surfaces, the dial plate 208 being secured to the top plate 140 by means of screws 231 so as to hold the cam member 226 against axial displacement while providing for rotation of such cam member relative to the top plate 140 and the dial plate 208.

The minute cam member 226 may be rotated by a minute cam lever 232 provided with a bore at one end for receiving the top of the minute cam member 226 and with a slot 234 extending longitudinally of the lever from the bore receiving the upper portion of the minute cam member 226. The upper portion of the minute cam member may be provided with a diametrically extending aperture 236 which snugly receives the flattened shank of a pin 238 having a head portion extending radially from the minute cam member 226 and positioned within the slot 234 in the minute cam lever 232. A screw 240 extends through the head of the pin 238 in threaded engagement therewith and has its opposite end extending through bores in the sides of the minute cam lever 232. A nut 242 on the end of the screw 240 holds the pin 238 in adjusted position with respect to the minute lever 232 and clamps such lever upon the upper portion of the minute cam member 226. By loosening the nut 242, rotating the screw 240 and then tightening the nut, the angular position of the lever 232 relative to the pin 238 and to the minute cam member 226 can be adjusted.

The minute cam lever 232 may be held in adjusted position with respect to the dial plate 208 by a locking bolt 244 having its head positioned in a T-slot 246 extending through the dial plate 208. The bolt 244 extends upwardly through a bore in the end of the lever 232 remote from the minute cam member 226. The lever 232 can be pivoted about the axis of the minute cam member 226 to move the head of the bolt 244 in the T-slot 246, and a nut 248 on the upper end of the bolt 244 then tightened to hold the lever 232 in adjusted position, the nut 248 serving as a knob for manual manipulation of the lever 232. The end of the lever 232 remote from the minute cam member 226 may also be provided with a sight glass 250 of any suitable transparent material such as transparent plastic extending longitudinally from the end of the lever and held in position by a screw 252. The sight glass may have an index line (not shown) on its lower surface adjacent graduations upon the upper surface of the dial plate 208 and arranged in an arc concentric with the axis of the minute cam member 226.

The cam 224 on the lower end of the minute cam member 226 is resiliently held against the cam anvil 228 (Fig. 9) by a spring 254 in the form of an endless band of spring material such as spring brass or spring steel. The spring 254 is positioned to have its axis parallel to the axis of the index plate 146 and has its lower portion positioned in an oval recess 256 in the upper surface of the index plate 146 and its upper portion in a similar recess 258 (Fig. 8) in the lower surface of the top plate 140. The two recesses 256 and 258 are out of alignment circumferentially of the index plate 146 and top plate 140 in a direction which compresses the spring 254 so that the cam 224 is resiliently urged into contact with the cam anvil 228 at all times. It will be apparent that pivotal movement of the minute cam lever 232 about the axis of the minute cam member 226 will cause relative movement between the top plate 140 and the index plate 146. The graduations on the top of the dial plate 208 may be such that the distance between two adjacent graduations is equivalent to an angle of one minute between the top plate 140 and the index plate 146 and, as shown in Fig. 6, the total range of movement may be plus or minus sixty minutes.

As stated above, the bottom plate 138 is secured to the top plate 140, and the scale or blade 168 may be secured to the edges or ends of the arms 156 and 158 of the bottom plate and top plate, respectively. The scale or blade 182 is secured to the scale-holding member 142 by the clamping member 186 and may extend between the arms 156 and 158. As also stated above, the index plate 146 may be locked to the scale-holding member by engagement between the teeth 196 on the increment ring 144 secured to the scale-holding member and the teeth 200 on the locking member 198 carried by the index plate 146. Thus, the scale-holding member 142 carrying the scale 182 may be set with respect to the index plate 146 at angles differing by one-degree increments, and then the bottom and top plates 138 and 140 carrying the scale 168 can be moved relative to the index plate 146 through small angles within such increments by means of the minute cam 224 actuated by the minute cam lever 232.

As shown in Figs. 12 and 13, a base member 260 may be substituted for the scale 168 by first removing the scale 168 and then attaching the arms 158 and 156 carried by the top and bottom plates 140 and 138, respectively, to the base member. The base member has an upper surface 262 parallel to a lower flat surface 264, and has an upstanding, vertically movable locking member 266 positioned in a slot 268 extending vertically into the base member adjacent one edge thereof from the upper surface 262. The locking member 266 has a head engaging in the grooves 164 in the arms 156 and 158. A screw 270 has a conical camming portion 272 at its end and extends laterally through a threaded bore in the base member 260 so as to force the locking member 266 downwardly in Fig. 13 and hold the arms 156 and 158 securely against the upper surface 262 of the base member. It will be apparent that the base 260 has a number of straight edges thereon and that the straight edges of the scale or blade 182 may be set at any desired angle with respect to such straight edges, i. e., to the lower surface 264 of the base 260, such lower surface being a flat surface to enable the device of the present invention to be employed upon surfaces such as the tables of machine tools, etc.

I claim as my invention:

1. An angle setting and measuring instrument comprising a blade-carrying element, a blade-carrying member pivotally secured to said element for angular movement relative to said element about a pivotal axis, an index member supported for pivotal movement relative to said element about said axis, means to lock said index member to said element at fixed angular positions spaced from each other by predetermined equal angular increments, means including a cam element journalled in one of said members for pivotal movement about an axis parallel to said pivotal axis, a cam on said cam element and a cam follower on the other of said members and engaged by said cam element for moving said blade-carrying member relative to said index member about said pivotal axis through angles smaller than said angular increments, and means to indicate the position of said cam in terms of said smaller angles.

2. An angle setting and measuring instrument comprising a blade-carrying element, a blade-carrying member pivotally secured to said first member for angular movement relative to said first member about a pivotal axis, an index member supported for pivotal movement relative to said element about said axis, means to lock said index member to said element at fixed angular positions spaced from each other by angular increments of even degrees, means including a cam element journalled in one of said members for pivotal movement about an axis parallel to said pivotal axis, a cam on said cam element and a cam follower on the other of said members and engaged by said cam element for moving said blade-carrying member relative to said index member about said pivotal axis through angles smaller than said angular increments, and means to indicate the position of said cam in terms of said smaller angles.

3. An angle setting and measuring instrument comprising a blade-carrying element, a blade-carrying member pivotally secured to said element for angular movement relative to said element about a pivotal axis, an index member supported for pivotal movement relative to said element about said axis, means to lock said index member to said element at fixed angular positions spaced from each other by predetermined equal increments, means including a rotary cam journaled in said indexblade-carrying member for pivotal movement about an axis parallel to said pivotal axis and a cam anvil carried by said index member for moving said blade-carrying member relative to said index member through angles smaller than said increments, and means to indicate the position of said cam relative to said cam anvil in terms of said smaller angles.

4. An angle setting and measuring instrument comprising a blade-carrying element, a blade-carrying member pivotally secured to said element for angular movement relative to said element about a pivotal axis, an index element supported by said blade-carrying element and said blade-carrying member for pivotal movement relative to said blade-carrying element and said blade-carrying member about said axis, means including angularly spaced projections on one of said elements and a circumferentially extending resilient arm on the other of said elements and having a free end provided with angularly spaced projections engageable with the projections on said one element to lock said other element to said one element at fixed angular positions spaced from each other by predetermined equal angular increments, said end of said arm being resiliently urged away from the projections on said one element and said instrument having means to releasably force said end of said arm against the projections on said one element, means including a cam and cam follower for moving said blade-carrying member relative to said index element about said pivotal axis through angles smaller than said angular increments, and means to move said cam relative to said cam follower and to indicate the position of said cam and cam follower relative to each other in terms of said smaller angles.

5. An angle setting and measuring instrument comprising a blade-carrying element, a blade-carrying member pivotally secured to said element for angular movement relative to said element about a pivotal axis, an index element supported by said blade-carrying element and said blade-carrying member for pivotal movement relative to said blade-carrying element and said blade-carrying member about said axis, means including projections angularly spaced one degree apart on said blade-carrying element and a circumferentially extending resilient arm on said index element and having a free end urged away from said projections by said resilient arm and provided with angularly spaced projections engageable with the projections on said blade-carrying element to lock said index element to said blade-carrying element at fixed positions spaced from each other by angular increments of one degree, means for forcing said free end of said arm into engagement with said projections on said blade-carrying element, means including a cam and cam follower for moving said blade-carrying member relative to said index element through angles smaller than said angular increments, and means to move said cam relative to said cam follower and to indicate in minutes the position of said cam and cam follower relative to each other.

6. An angle setting and measuring instrument comprising a first member, a second member pivotally secured to said first member for angular movement relative to said first member about a pivotal axis, an index member supported by said first and second members for pivotal movement relative to said first and second members about said axis, means to lock said index member to said first member at fixed angular positions spaced from each other by predetermined equal angular increments, said means including angularly spaced locking elements on said first member, and including a cam carried by said second member and a locking member carrier by said index member, said locking member having a locking portion for engaging said locking elements on said first member, said locking portion being resiliently urged away from said locking elements and said index element having a cam-engaging surface for engagement by said cam to force said locking portion into engagement with said locking elements, said instrument having means for moving said second member relative to said index member through angles smaller than said angular increments while said first member is locked to said index member and for indicating the position of the last-named means in terms of said smaller angles, said cam-engaging surface being concentric with said pivotal axis to permit movement of said second member relative to said index member while said first member is locked to said index member.

7. An angle setting and measuring instrument comprising a first member, a second member pivotally secured to said first member for angular movement relative to said first member about a pivotal axis, an index member supported by said first and second members for pivotal movement relative to said first and second members about said axis, means to lock said index member to said first member at fixed angular positions spaced from each other by angular increments of one degree, said means including locking elements on said first member spaced from each other by angles of one degree, and including a cam carried by said second member and a locking member carried by said index member, said locking member having a locking portion engaging said locking elements on said first member, said locking portion being resiliently urged away from said locking elements and said index member having a cam-engaging surface for engagement by said cam to force said locking portion into engagement with said locking elements, said instrument having means for moving said second member relative to said index member through angles smaller than said angular increments while said first member is locked to said index member and for indicating the position of the last named means in terms of said smaller angles, said cam-engaging surface being concentric with said pivotal axis to permit movement of said second member relative to said index member while said first member is locked to said index member.

8. An angle setting and measuring instrument comprising a scale-carrying element, a scale-carrying member pivotally secured to said element for angular movement relative to said element about a pivotal axis, said element and said scale-carrying member each having an integral scale extending tangentially therefrom and having an edge intersecting said pivotal axis, an index member positioned between said element and said scale-carrying member and pivotally movable with respect to said element and said scale-carrying member about said axis, means to lock said index member to said element at fixed angular positions spaced from each other by predetermined equal angular increments, means including a cam and cam follower for moving said scale-carrying member relative to said index member through angles smaller than said angular increments, said cam being journalled in one of said members for pivotal movement about an axis parallel to said pivotal axis and said cam follower being carried by the other of said members, and means to indicate the relative position of said cam and cam follower in terms of said smaller angles.

9. An angle setting and measuring instrument comprising a scale-carrying element, a scale-carrying member pivotally secured to said element for angular movement relative to said element about a pivotal axis, said element and said scale-carrying member each having an integral scale extending tangentially therefrom and having a straight edge intersecting said pivotal axis, an index member positioned between said element and said scale-carrying member and pivotally movable with respect to said element and said scale-carrying member about said axis, means to lock said index member to said element at fixed angular positions spaced from each other by equal angular increments of one degree, means including a cam and cam follower for moving said scale-carrying member relative to said index member through angles smaller than said angular increments, said cam being journalled in one of said members for pivotal movement about an axis parallel to said pivotal axis and said cam follower being carried by the other of said members, and means to indicate the relative position of said cam and cam follower in terms of said smaller angles.

10. An angle setting and measuring instrument comprising a scale-carrying element, a scale-carrying member pivotally secured to said element for angular movement relative to said element about a pivotal axis, said element and said scale-carrying member each having an integral scale extending tangentially therefrom and having a straight edge intersecting said pivotal axis, an index member positioned between said element and said scale-carrying member and pivotally movable with respect to said element and said scale-carrying member about said axis, means including projections angularly spaced by one degree on said element and a locking member carried by said index member and having a locking portion engageable with said projections to lock said index member to said first member at fixed angular positions spaced from each other by equal angular increments of one degree, means for releasably engaging said locking portion with said projections, means including a rotary cam journaled in said scale-carrying member for pivotal movement about an axis parallel to said pivotal axis and a cam follower on said index member for moving said second member relative to said index member through angles smaller than said angular increments, and means to indicate the relative position of said cam and cam follower in terms of said smaller angles.

11. An angle setting and measuring instrument comprising a blade-carrying element, another element rigidly secured thereto, a blade-carrying member positioned between said blade-carrying element and said other element and pivotally secured to said blade-carrying element for angular movement relative to said blade-carrying element about a pivotal axis, blades removably secured to said blade-carrying element and said blade-carrying member, an index member between said blade-carrying element and said blade carrying member and supported for pivotal movement relative to said blade-carrying element and said blade-carrying member about said axis, means to lock said index member to said blade-carrying element at fixed angular positions spaced from each other by predetermined equal angular increments, means including a cam and cam follower for moving said blade-carrying member relative to said index member through angles smaller than said angular increments, said cam being journalled in one of said members for pivotal movement about an axis parallel to said pivotal axis, and means to move said cam relative to said cam follower and to indicate the position of said cam and cam follower relative to each other in terms of said smaller angles.

12. An angle setting and measuring instrument comprising a blade-carrying element, another element secured thereto, a blade-carrying member positioned between said blade-carrying element and said other element and pivotally secured to said blade-carrying element for angular movement relative to said blade-carrying element about a pivotal axis, blades removably secured to said blade-carrying element and said blade-carrying member, an index member between said blade-carrying element and said blade-carrying member and supported for pivotal movement relative to said blade-carrying element and said blade-carrying member about said axis, means including projections on said blade-carrying element angularly spaced from each other by an angle of one degree and a locking member on said index member engageable with said projections to lock said index member to said blade-carrying element at fixed angular positions spaced from each other by angular increments of one degree, means including a rotary cam journalled in said blade-carrying member for pivotal movement about an axis parallel to said pivotal axis and a cam follower on said index member for moving said blade-carrying member relative to said index member through angles smaller than said angular increments, and means to move said cam relative to said follower and to indicate the position of said cam and cam follower relative to each other in terms of said smaller angles.

13. An angle setting and measuring instrument comprising a first element having an arm extending therefrom, another element secured to said first element and having an arm extending therefrom in alignment with the arm extending from said first element, said arms being adapted to have an element provided with a straight edge releasably attached thereto, a member positioned between said first element and said other element and pivotally secured to said first element for angular movement relative to said first element about a pivotal axis, said member adapted to have a blade releasably attached thereto so as to extend between said arms, an index member between said first element and the first mentioned member and supported for pivotal movement relative to said first element and said first mentioned member about said axis, means to lock said index member to said first element at fixed angular positions spaced from each other by predetermined equal angular increments, means including a cam and cam follower for moving said first mentioned member relative to said index member through angles smaller than said angular increments, said cam being journalled in one of said members for pivotal movement about an axis parallel to said pivotal axis, and means to move said cam relative to said follower and to indicate the position of said cam and cam follower relative to each other in terms of said smaller angles.

14. An angle setting and measuring instrument comprising a first element having an arm extending therefrom, another element rigidly secured to said first element and having an arm extending therefrom in alignment with and spaced from the arm on said first element, said arms being adapted to have a blade releasably secured thereto, a member pivotally secured to said first element between said other element and said first element for angular movement relative to said first element about a pivotal axis, said member being adapted to have a scale releasably secured thereto, an index member supported between said first element and the first mentioned member for pivotal movement relative to said first element and said first mentioned member about said axis, means including locking elements angularly spaced on said first element to lock said index member to said first element at fixed angular positions spaced from each other by predetermined equal angular increments, said means including a cam journalled in said first mentioned member for pivotal movement about an axis parallel to said pivotal axis and a locking element carried by said index member and having a cam-engaging surface for engagement by said cam and a locking portion for engaging said locking element of said first element, and means for moving said first mentioned member relative to said index member through angles smaller than said increments and for indicating the position of the last-named means in terms of said smaller angles, said cam-engaging surface being concentric with said pivotal axis to permit movement of said first mentioned member relative to said index member.

References Cited in the file of this patent

UNITED STATES PATENTS

| | | |
|---|---|---|
| 474,699 | Starrett | May 10, 1892 |
| 552,751 | Denison | Jan. 7, 1896 |
| 774,515 | Geier | Nov. 8, 1904 |
| 918,065 | Low | Apr. 13, 1909 |
| 996,591 | La Follette | June 27, 1911 |
| 1,166,501 | Watkins | Jan. 4, 1916 |
| 1,329,005 | Neumaier | Jan. 27, 1920 |
| 1,331,415 | Civitts | Feb. 17, 1920 |
| 1,358,604 | Zhukoff | Nov. 9, 1920 |
| 1,953,804 | Hayes | Apr. 3, 1934 |
| 1,998,352 | Bachmann | Apr. 16, 1935 |
| 2,124,358 | Vancura | July 19, 1938 |
| 2,162,767 | Thurlow | June 20, 1939 |
| 2,412,084 | Gieske | Dec. 3, 1946 |
| 2,443,364 | Vancura | June 15, 1948 |

UNITED STATES PATENT OFFICE

CERTIFICATE OF CORRECTION

Patent No. 2,837,826  June 10, 1958

Joseph B. Cox

It is hereby certified that error appears in the printed specification of the above numbered patent requiring correction and that the said Letters Patent should read as corrected below.

Column 8, line 60, for "sprirng" read -- spring --; column 10, line 10, for "indexblade-carrying" read -- blade-carrying --; column 11, lines 5 and 6, for "carrier" read -- carried --; line 10, for "element" read -- member --; line 56, for "intersectiong" read -- intersecting --.

Signed and sealed this 12th day of August 1958.

(SEAL)
Attest:

KARL H. AXLINE
Attesting Officer

ROBERT C. WATSON
Commissioner of Patents